United States Patent
Cox et al.

(10) Patent No.: US 7,447,996 B1
(45) Date of Patent: Nov. 4, 2008

(54) SYSTEM FOR USING GENDER ANALYSIS OF NAMES TO ASSIGN AVATARS IN INSTANT MESSAGING APPLICATIONS

(75) Inventors: Susan M. Cox, Rochester, MN (US); Janani Janakiraman, Austin, TX (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/038,954

(22) Filed: Feb. 28, 2008

(51) Int. Cl.
*G06F 3/00* (2006.01)
*G06F 3/01* (2006.01)

(52) U.S. Cl. .............. 715/758; 715/751; 715/753; 715/759; 709/203; 709/204

(58) Field of Classification Search ............... 715/751, 715/753, 758, 759; 709/203, 204; 704/1, 704/5, 8, 10
See application file for complete search history.

(56) References Cited

U.S. PATENT DOCUMENTS

| | | | |
|---|---|---|---|
| 5,548,507 A * | 8/1996 | Martino et al. .............. 704/1 |
| 6,292,198 B1 * | 9/2001 | Matsuda et al. ............. 345/473 |
| 6,453,294 B1 * | 9/2002 | Dutta et al. .............. 704/270.1 |
| 6,476,815 B1 * | 11/2002 | Ando .......................... 345/473 |
| 6,549,883 B2 * | 4/2003 | Fabiani et al. ................. 704/10 |
| 6,963,871 B1 * | 11/2005 | Hermansen et al. ............. 707/6 |
| 2002/0147766 A1 * | 10/2002 | Vanska et al. ................ 709/203 |
| 2002/0186244 A1 * | 12/2002 | Matsuda et al. ............. 345/757 |
| 2003/0067554 A1 * | 4/2003 | Klarfeld et al. ............. 348/461 |
| 2003/0069997 A1 * | 4/2003 | Bravin et al. ................ 709/250 |
| 2003/0101227 A1 * | 5/2003 | Fink ............................ 709/207 |
| 2003/0216917 A1 * | 11/2003 | Sakunaga et al. ........... 704/251 |
| 2004/0002850 A1 * | 1/2004 | Shaefer et al. ................. 704/5 |
| 2004/0179037 A1 * | 9/2004 | Blattner et al. .............. 345/751 |
| 2005/0234885 A1 * | 10/2005 | Szeto et al. .................... 707/3 |
| 2005/0248574 A1 * | 11/2005 | Ashtekar et al. ............ 345/473 |
| 2006/0020904 A1 * | 1/2006 | Aaltonen et al. ............ 715/850 |
| 2006/0121992 A1 * | 6/2006 | Bortnik et al. ................ 463/43 |
| 2006/0143569 A1 * | 6/2006 | Kinsella et al. ............. 715/752 |

(Continued)

OTHER PUBLICATIONS

Cornetto, Karen et al "Utilizing usernames for sex categorization in computer mediated communication: examining perceptions and accuracy" 2006.*

*Primary Examiner*—Weilun Lo
*Assistant Examiner*—Steven B Theriault
(74) *Attorney, Agent, or Firm*—Cantor Colburn LLP; Libby Handelsman (57) ABSTRACT

A software module for displaying gender-based avatar representations of users in instant messaging communications comprises a username analysis component and an interface component. The username analysis component is configured to be implemented within an instant messaging system providing for communication between a first user and a second user each having a user account registered with the instant messaging system. The username analysis component is configured to perform an anthroponomastic analysis of a username of the first user to assign a probable gender for the first user. The probable gender is selected from male, female, and neutral. The interface component is configured to display a gender-based avatar representation indicative of the probable gender for the first user to the second user when the first user and the second user are participating in a communication session with one another via the instant messaging system.

5 Claims, 4 Drawing Sheets

U.S. PATENT DOCUMENTS

| | | | |
|---|---|---|---|
| 2006/0184355 A1* | 8/2006 | Ballin et al. | 704/8 |
| 2007/0101281 A1* | 5/2007 | Simpson et al. | 715/764 |
| 2007/0112624 A1* | 5/2007 | Jung et al. | 705/14 |
| 2007/0113181 A1 | 5/2007 | Blattner et al. | |
| 2007/0124721 A1* | 5/2007 | Cowing et al. | 717/100 |
| 2007/0130001 A1* | 6/2007 | Jung et al. | 705/14 |
| 2007/0136745 A1* | 6/2007 | Garbow et al. | 725/34 |
| 2007/0167204 A1* | 7/2007 | Lyle et al. | 463/9 |
| 2007/0198937 A1* | 8/2007 | Paris | 715/745 |
| 2007/0214106 A1 | 9/2007 | Johnston et al. | |
| 2007/0218997 A1* | 9/2007 | Cho | 463/42 |
| 2008/0104225 A1* | 5/2008 | Zhang et al. | 709/224 |

* cited by examiner

SYSTEM FOR USING GENDER ANALYSIS OF NAMES TO ASSIGN AVATARS IN INSTANT MESSAGING APPLICATIONS

BACKGROUND OF THE INVENTION

1. Field of the Invention

Exemplary embodiments of the present invention relate to electronic messaging systems, and more particularly, to the display of avatars representing users communicating within electronic messaging systems.

2. Description of Background

Instant messaging (IM) is an online chat medium based on typed text that allows users to communicate with each other and to collaborate in real-time over a network, commonly the Internet. Instant messaging applications monitor and report the status of users that have established each other as online contacts. This information is typically presented to a user in a window. Instant messaging allows instantaneous communication between a number of parties simultaneously by transmitting information quickly and efficiently, and featuring immediate receipt of acknowledgement or reply. For these reasons, instant messaging applications also are often used by users conducting business. By utilizing instant messaging, business users can view each other's availability and initiate a text conversation with colleagues or customers when a desired contact becomes available. Millions of users communicate using instant messaging systems every day. With instant messaging becoming an important part of both personal and business communications, communication enhancements are important to the continued success of this type of communication tool.

With today's advanced communication technology, people increasingly communicate with people from cultures very different from their own without the restrictions of time and space. The social conventions of electronic communications such as instant messaging are similar that those of face-to-face communications and thus often reflect the societal conventions of the cultures in which the parties exist. In face-to-face situations, however, the concurrent use of both verbal and non-verbal communication enables a rich, multi-modal environment that provides each communicating party with the ability to construct a physical identification of another communicating party using visual and/or auditory characteristics. With digital communications that involve typed text such as instant messaging, all that is typically communicated are the words themselves, which do not always necessarily provide sufficient gender identification information that would be conveyed in a face-to-face conversation.

There are thousands of languages in use today, which provides for a wide variety of given or first names. In nearly every culture, given names are commonly used as a contextual form of identity, of which gender is one component. In most cultures, persons of different gender are generally addressed differently during communications according to particular cultural and social conventions (for example, in English speaking countries, men can be addressed formally using 'Sir' or 'Mr.', and women can be addressed formally using 'Madam', 'Mrs.', 'Miss', or 'Ms.').

Electronic communications are generally subject to the same or similar social categories and rules to that of real world communications, and as a result, the types of cultural differences described above can often present problems in assessing gender during instant messaging conversations. Generally, an English speaking person can correctly guess whether a particular individual whom he never met is female or male during a communications session based on the first name of that person, when it is provided. But when messaging with people having names originating from other cultures with which the person is not very familiar, for example, people with Indian or Chinese first names, the task of assessing gender may be more challenging. Particularly in situations in which the electronic messaging system is being used for professional purposes, a lack of knowledge of the gender of the person being communicated with in a messaging session this could lead to potentially offensive communication gaffes and faux pas.

SUMMARY OF THE INVENTION

The shortcomings of the prior art can be overcome and additional advantages can be provided through exemplary embodiments of the present invention that are related to a software module for displaying gender-based avatar representations of users in instant messaging communication sessions. The software module comprises a username analysis component and an interface component. The username analysis component is configured to be implemented within an instant messaging system providing for communication between a first user and a second user each having a user account registered with the instant messaging system. The username analysis component is configured to perform an anthroponomastic analysis of a username of the first user to assign a probable gender for the first user. The probable gender is selected from male, female, and neutral. The interface component is configured to display a gender-based avatar representation indicative of the probable gender for the first user to the second user when the first user and the second user are participating in a communication session with one another via the instant messaging system.

The shortcomings of the prior art can also be overcome and additional advantages can also be provided through exemplary embodiments of the present invention that are related to methods, computer program products, and data processing systems corresponding to the above-summarized method are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented within electronic messaging systems that display graphical avatars to represent participants in communications to provide a mechanism for performing an anthroponomastic analysis of the real names of users to determine probable genders for the users and displaying avatars having genders that correspond to the determined probable gender to represent the users to one another during their messaging communications.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Figure 1:
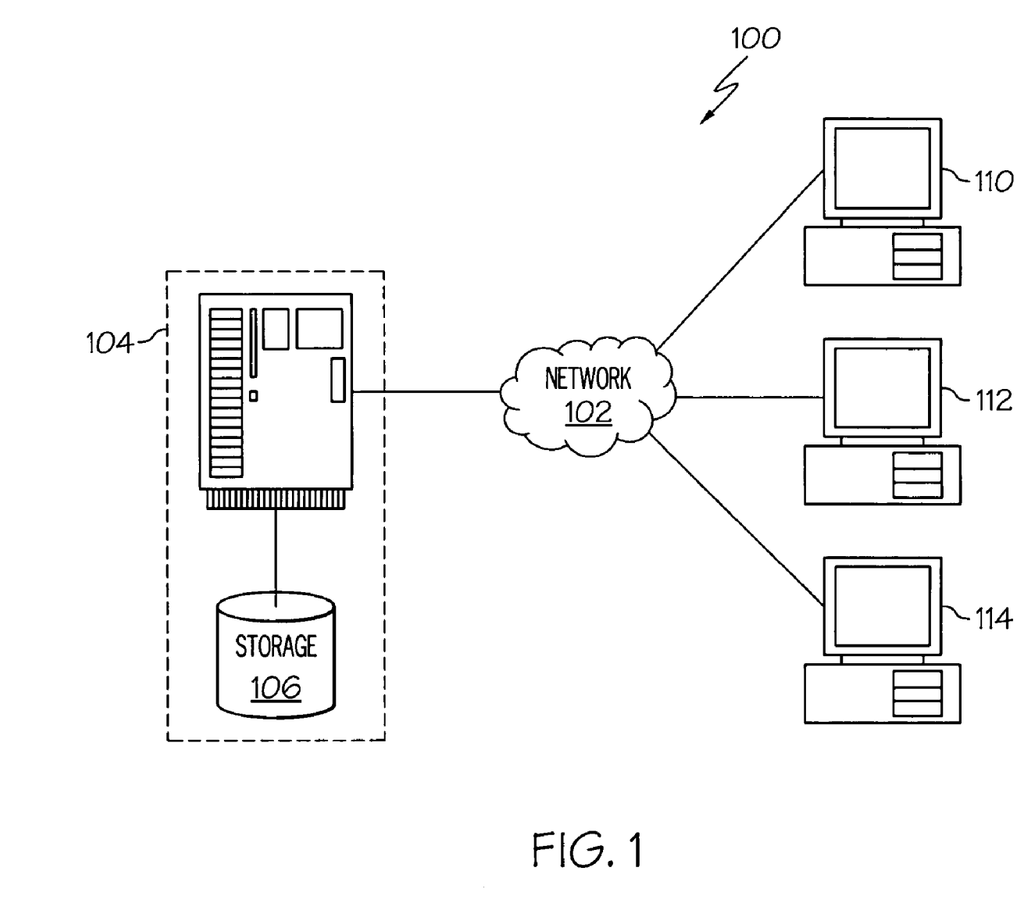
FIG. 1 is a block diagram illustrating a representation of a computer network system within which an exemplary embodiment of the present invention can be implemented.

Referring now to FIG. 1, an example of an electronic messaging system providing a client/server environment within which exemplary embodiments of the present invention can be implemented is illustrated. Messaging system 100 contains network 102, which is the medium used to provide communications links between various devices and computers connected together within the network system. Network 102 may include connections such as wire, wireless communication links, or fiber optic cables, for example.

In the depicted example, an electronic messaging system server 104 is communicatively connected to network 102 along with storage unit 106. In addition, messaging client systems 110, 112, and 114 are communicatively connected to network 102. These client systems 110, 112, and 114 may be, for example, personal computers or network computers. Client systems 110, 112, and 114 are each operated by a messaging system user and act as clients to server system 104 in this example. Messaging server 104 is configured to control a messaging session between client messaging systems 110, 112, and 114 being operated by users engaged in peer-to-peer network communications via a network 102. In exemplary embodiments, messaging system 100 can include additional servers, clients, and other devices not shown in FIG. 1.

Network 102 may comprise the Internet, in which the network includes a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network system 100 also may be implemented as any of a number of different types of networks, or combinations thereof, such as, for example, an intranet, a local area network (LAN), or a wide area network (WAN). The client/server environment can be implemented within any suitable network architecture. FIG. 1 is thus intended as a non-limiting example, and not as an architectural constraint for implementing exemplary embodiments of the present invention.

In the present exemplary embodiment, to access messaging system 100 to begin a messaging session, a client system establishes a connection to messaging server 104 via network 102. Once a connection to messaging server 104 has been established, the connected client system may directly or indirectly transmit data to and access content from the messaging server. A user accessing messaging server 104 through the connected client system can then able to use a messaging client application to, for example, view whether particular users are online, view whether users may receive messages, exchange messages with particular message recipients, participate in group chat rooms, trade files such as pictures, invitations or documents, find other message recipients with similar interests, get customized information such as news and stock quotes, and search the Web.

In a typical scenario within messaging system 100, a client sender enters a message for a messaging session by operating a messaging client application at a client messaging system such as client system 110. The message entry is transmitted to messaging server 104 via network 102. Messaging server 104 then distributes the message entry to a client messaging system such as client system 112 being operated by the intended client recipient participating in the messaging session via network 102. A messaging client application being used at the recipient's client system renders the message and other information served by messaging server 104. To transfer data, messaging server can employ one or more standard proprietary messaging protocols. The messaging client applications provide a user interface through which client senders and recipients can access messaging server 104 to send and receive messages. In exemplary embodiments, a separate messaging client application can be installed on each client system for operation by the user of that client system. Alternatively, a single messaging application can be provided as a Web messaging application in a standard format such as HTML/XHTML that may be supported and accessed by Web browsers installed on each client system via network 102. In exemplary embodiments, messaging server 104 can be configured to provide the Web messaging application.

As thus described, in exemplary embodiments, the electronic messages sent between a sender client system and recipient client system can be routed through messaging server 104. In alternative exemplary embodiments, the electronic messages sent between a sender client system and recipient client system can be routed through a third party server (not shown), and, in some cases, can also be routed through messaging server 104. In yet other alternative exemplary embodiments, the electronic messages can be sent directly between a sender client system and recipient client system.

It should be noted that the term "user" is used herein to refer to one who uses a computer system, such as one of client systems 110, 112, and 114. When initially connecting to messaging system 100, client system users may need to login to the messaging system by authenticating themselves for the purposes of accounting, security, logging, and/or resource management through a user interface provided by the messaging client application being operated at the user's client messaging system. For purposes of authentication, a user can have an account (a user account) and a username (also sometimes called a username, handle, or nickname), and in most cases also a password. The information for each user account can be maintained by messaging server 104 in storage 106.

It should also be noted that the terms "client" and "server" are used herein to refer to a computer's general role as a requester of data (the client) or provider of data (the server). Further, the terms "sender" and "recipient" are used to refer to a client system user's general role as a sender of a message during a messaging session (the sender) or as a receiver of a message during a messaging session (the recipient). Additionally, each of client messaging systems 110, 112, and 114 and messaging server 104 may function as both a "client" and a "server" and may be implemented utilizing a computer system such as data processing system 200, described below with reference to FIG. 2. Further, users of each of client messaging systems 110, 112, and 114 may function as both a "sender" and a "recipient" and typically act as both during a typical messaging session. Still further, while exemplary embodiments are described herein with emphasis upon messaging server 104 controlling a messaging session between client messaging systems 110, 112, and 114 engaged in peer-to-peer network communications via a network 104, alternative exemplary embodiments can be implemented to be performed or partially performed within client messaging systems 110, 112, and 114. Furthermore, other types of messaging systems may be utilized to implement exemplary embodiments.

The use of graphical avatar images to provide proxy representations for users has been gradually introduced in electronic messaging systems. An avatar can provide a mechanism for enabling a non-textual identification of a user associated with the avatar. As will now be described, exemplary embodiments of the present invention can be implemented within electronic messaging systems, such as messaging system 100 of FIG. 1, that are configured to display graphical avatars on client systems to provide a representation of the participants in communication sessions to one another. Exemplary embodiments can be implemented to provide a mechanism for performing an anthroponomastic analysis of the usernames or usernames of users to determine probable genders for the users and for displaying avatars having genders that correspond to the determine genders for the users to represent the users during their electronic messaging communications with other users.

Figure 2:
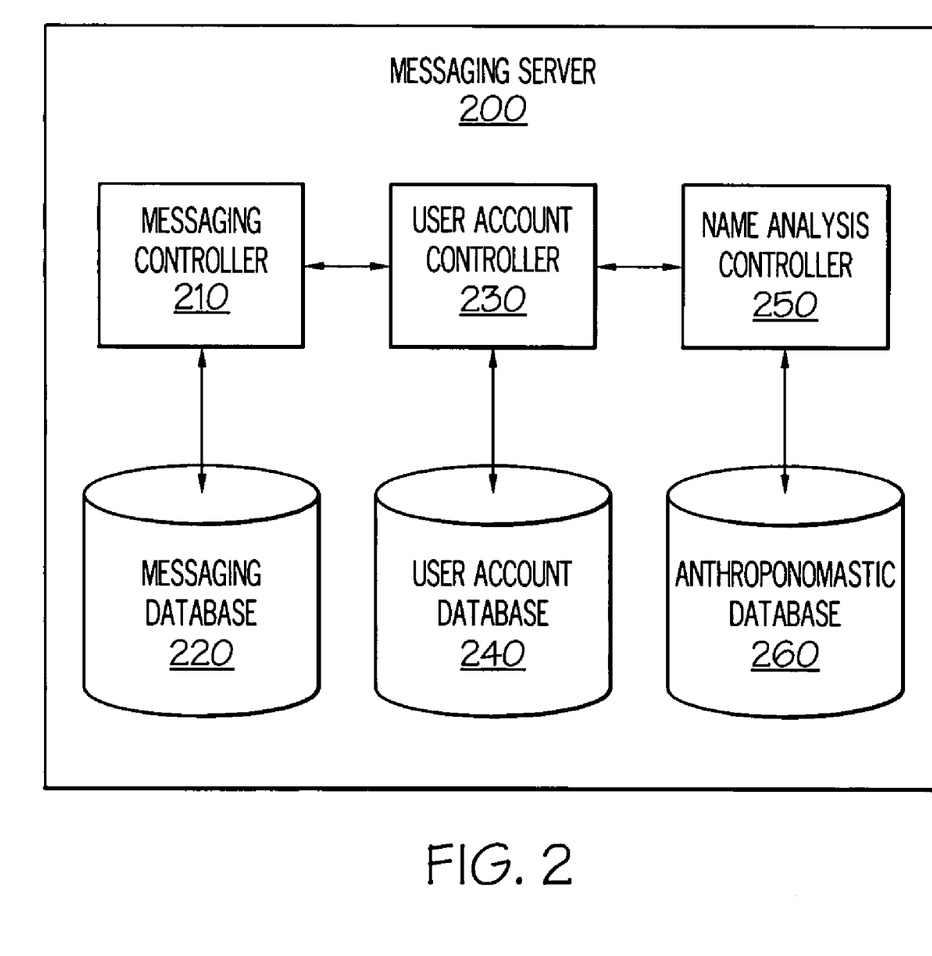
FIG. 2 is a block diagram illustrating a representation of a messaging server system within which an exemplary embodiment of the present invention is implemented.

Referring now to FIG. 2, a messaging system server 200 implementing an exemplary embodiment of the present invention is illustrated. Messaging server 200 may be implemented, for example, as messaging server 104 within messaging system 100 of FIG. 1. As illustrated in FIG. 2, messaging server 200 can comprise multiple controller components and databases located within a single server system or within multiple server systems, where the multiple server systems are integrated with or accessible by users of messaging client systems in a messaging system via a network. Messaging server 200 includes a messaging controller component 210 that is configured to control the distribution of message communications for the messaging system provided by the messaging server. In the present exemplary embodiment, messaging controller 210 will be described with respect to message communications such as instant messaging. In alternative exemplary embodiments, messaging controller 210 may control other types of available electronic communications such as e-mail messaging or chat room messaging.

In the present exemplary embodiment, messaging controller 210 distributes instant messaging communications between sender and recipient users of messaging client systems in a channel opened by the messaging controller for the messaging session. Communicating users are each represented by an identifier, such as a username, and a graphical avatar that is displayed to other users in a user interface provided by the messaging client application being operated by each user at that user's client system. Messaging controller 210 can be configured to distribute the identifier and the avatar of each user to other users engaged in communications sessions with that user. Message communications transferred between users as controlled by messaging controller 210 can be stored in a transferred messages database 220 for a specified period of time, and all the entries for a specific instant messaging session can be catalogued together within the messages database.

Messaging server 200 also includes a user account controller component 230, a user account database 240, a username analysis controller 250, and an anthroponomastic information database 260. User account controller 230 is configured to register user accounts for new users of the messaging system, to control authentication of registered users logging into the messaging system, and to maintain identifiers and other attributes for each user account in user account database 240. During registration of a particular user, user account controller 230 determines a username for the user and stores the username in user account database 240. The identifiers and other attributes maintained in user account database 240 for a particular user account can include the username or screen name, a password, the avatar representation, and other information about the particular user assigned the account. The other information about a particular user may include, for example, a personal profile, which may include information about the user's name, regional areas of origin, national language, company association, memberships, and personal characteristics.

In the present exemplary embodiment, username analysis controller 250 is configured to perform an anthroponomastic analysis of the username or screen name of each newly registered user to determine a probable gender for the user and to assign a gender-based avatar representation for the user that will be displayed in the user interfaces of other users during instant messaging communications with the newly registered user. Anthroponymy is the study of the names of human beings. Thus, exemplary embodiments are particularly well-suited for use in situations where a new user specifies his or her full name or given name as his or her username. To perform analysis of usernames, username analysis controller 250 is configured to access data anthroponomastic information database 260, which can store information such as, for example, an expansive list of names compiled from those used in many different cultures catalogued according to gender (that is, male, female, or unisex), a list of rules for associating a username not included in the list of names with a particular culture, and a list of rules derived from naming conventions that are employed in many different cultures catalogued culturally, linguistically, nationally, regionally, and/or according to other relevant anthroponomastic criteria.

When a new user registers with the messaging system, username analysis controller 250 is configured to perform an anthroponomastic analysis of the new user's username to determine a probable gender for the user. Such an analysis can, for instance, first involve accessing the list of names in anthroponomastic information database 260 to attempt to find a match. If a match for the username is found in the list of names, username analysis controller 250 can assign the user with the gender associated with the name in anthroponomastic information database 260. The assigned gender can be male, female, or unisex. If no match is found in the list of names, username analysis controller 250 can be configured access the list of rules in anthroponomastic information database 260 to attempt to identify a particular culture with which the name is commonly associated (for example, many terms used for names may have characteristics that may be used to identify a cultural origin for the term) and the list of rules derived from naming conventions for the identified culture to attempt to determine a gender to assign to the name. A naming convention is a collection of rules followed by a set of names. Naming conventions can be used to deduce useful rules based on the character sequence of known names and knowledge of the rules followed in the known names.

For example, where the newly registered user's username is not found in the list of names in anthroponomastic information database 260 but is identified using the list of cultural rules as being a Hindu name, username analysis controller 250 can use the list of rules derived from naming conventions for the Hindu culture stored in the anthroponomastic information database to attempt to associate a probable gender with the username. According to Hindu naming conventions, a first name that ends with the letter 'i' is more likely to be a female name. Thus, for a newly registered user having the username 'Amodini', username analysis controller 250 would assign that user with a probable gender of female. Similarly, where the newly registered user's username is not found in the list of names in anthroponomastic information database 260 but is identified as being a Chinese name, username analysis controller 250 can use the list of rules derived from naming conventions for the Chinese culture stored in the anthroponomastic information database to attempt to associate a gender with the username. According to Chinese naming conventions, the family name is placed before the given name, in reverse of the regular order of English names. Furthermore, according to Chinese naming conventions, given names resonant of qualities that are perceived to be either masculine or feminine are frequently given, with males being linked with strength and firmness, and females with beauty and flowers. Females also are commonly given names that repeat a character. Thus, for a newly registered user having a username of 'Xiuxiu' or 'Lili', username analysis controller 250 would assign that user with a probable gender of female. In certain situations, username analysis controller 250 may be unable to determine a probable gender for a username after accessing the list names, the list of cultural rules, and the list of rules derived from naming conventions, in which case the username analysis controller can assign a neutral gender to the user.

Based on the probable gender determined for the user, username analysis controller 250 can then assign a gender-based avatar to the user based upon the determined gender. Thus, if the probable gender for the user's username is determined to be female, the user will be assigned with a female avatar. If the probable gender for the user's username is determined to be male, the user will be assigned with a male avatar. Finally, if the probable gender for the user's username is determined to be neutral (that is, either the name is unknown and name analysis controller 250 is unable to determine a probable gender based upon information in the list of cultural rules and the list of rules derived from naming conventions in anthroponomastic information database 260, or the name is a unisex one that is commonly given to both males and females, such as Pat, which may indicate a full name of Patrick or Patricia) the user will be assigned with generic, genderless human figure image as his or her avatar. Of course, some unisex names are homophones, pronounced the same for both genders but spelled differently. A common example of this is English names in which a final 'y' is used for the masculine form and a final 'i' or 'ie' is used for the feminine form (for example, the names Terry and Teri). In these situations, username analysis controller 250 can be configured to utilize naming conventions to assign a male or female gender-based avatar to a user specifying a unisex homophone as a username instead of a genderless avatar. After assigning an avatar representation to a particular user, username analysis controller 250 can be configured to direct user account controller 230 to store the avatar representation assigned to the user in the user profile data maintained for the user in user account database 240.

In exemplary embodiments, once username analysis controller 250 has made a determination of a probable gender for a particular user and assigned a gender-based avatar or a neutral gender avatar to the user, messaging server 200 can be further configured to provide the user with the option of overriding the assigned avatar by selecting a different avatar representation. For example, when username analysis controller 250 has assigned a neutral gender avatar to a particular user, messaging server 200 can be further configured to provide an indication to the user of such assignment and provide the user with the option of selecting an appropriate gender-based avatar to replace the neutral gender avatar as the user's avatar representation in communication sessions within the messaging system. In another example, when username analysis controller 250 has assigned a gender-based (that is, male or female) avatar to a particular user, messaging server 200 can be further configured to provide an indication to the user of such assignment and provide the user with the option of selecting a neutral gender avatar to replace the gender-based avatar as the user's avatar representation if the particular user does not wish to so indicate his or her gender to other users in communication sessions within the messaging system. When a user has opted to override the assigned avatar by selecting a different avatar representation, username analysis controller 250 can be configured to direct user account controller 230 to store the avatar representation selected by the user, rather than the assigned avatar, in the user profile data maintained for the user in user account database 240.

Because each messaging system user's data is stored in user account database 240, when a first user accesses the messaging system, messaging server 200 can retrieve the accessing user's profile data from the database and to provide the user's gender-based avatar representation in communications with other users accessing the messaging system. The first user's avatar then can be displayed in a window provided within the user interface of the messaging client application being used by other users engaged in a communications session with the first user. Thus, the user's gender-based avatar can be used to represent the user to other users in a communications session. In exemplary embodiments, the first user's avatar may also be displayed in a window or menu option that provides a "buddy", colleague, or associate list, or other list of regular contacts, within the user interfaces of messaging client application being used by other users to provide an option for the other users communicate with or check the status of the first user.

Figure 3:
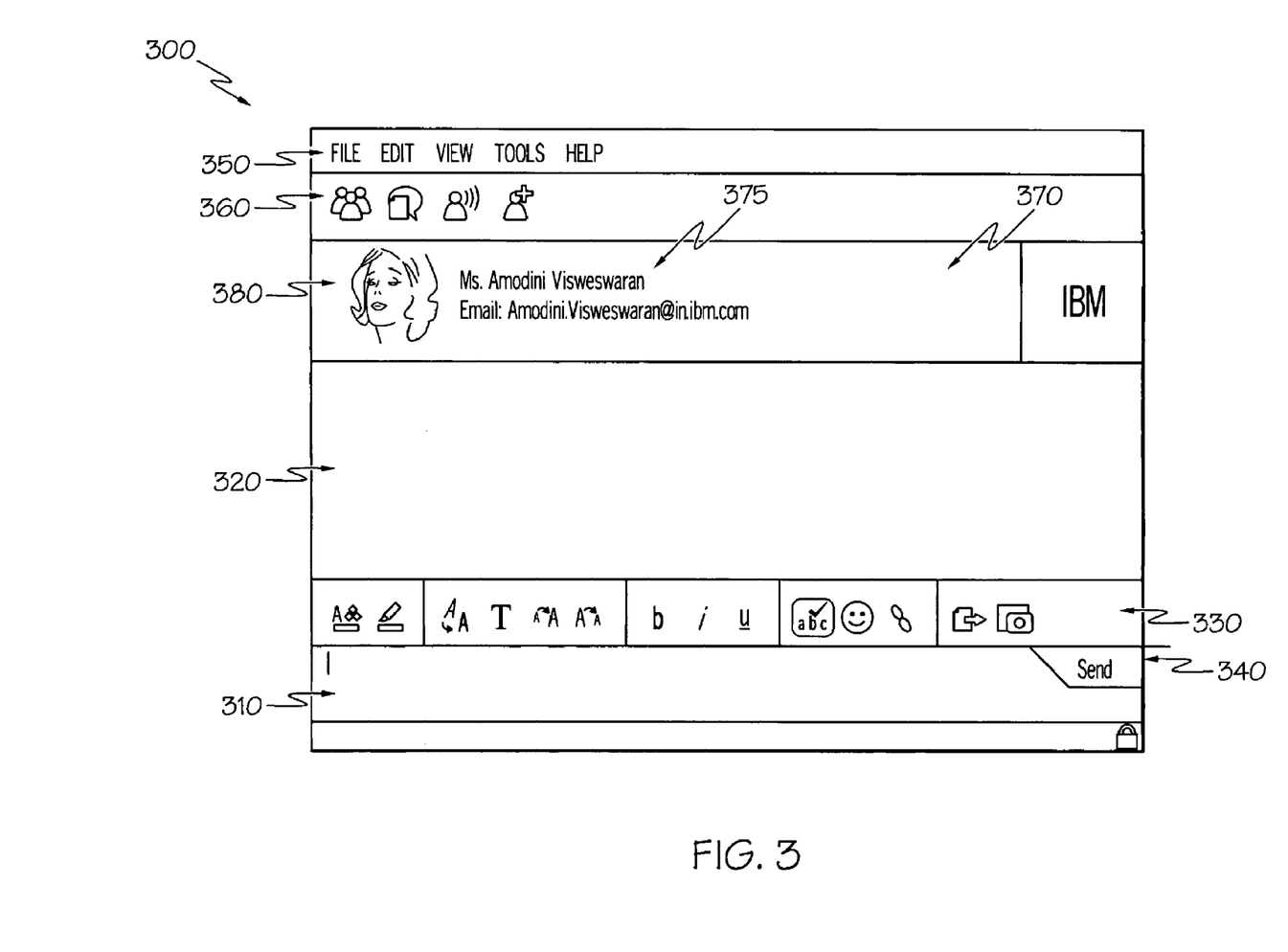
FIG. 3 is a sample illustration of a messaging session window provided by a graphical user interface of within a messaging system implementing an exemplary embodiment of the present invention.

Referring now to FIG. 3, a sample messaging session window 300 provided within a graphical user interface of a messaging client application being used to access a messaging system implementing an exemplary embodiment of the present invention is illustrated. Messaging session window 300 may be viewed by a first user of the messaging client application who is connected to the messaging system to engage in communications sessions with a second user connected to the messaging system. Messaging session window 300 includes a message composition area 310 for composing messages to be sent to the second user during the communications session and a message history text box 320 for displaying a transcript of the message communications session between the first and second users. Each of the messages sent to, or received from, the second user can be listed in chronological order in message history text box 320, with each listed message providing an indication of which user sent the message.

Messaging session window 300 also includes a set of feature controls 330 and a "send" control button 340. Feature controls 330 can be accessed by the first user to control features such as message encryption, conversation logging, conversation forwarding to a different communications mode, font size and color control, and spell checking, among others. Send control button 340 can be accessed by the first user to trigger sending of a message typed into instant message composition area 310. Messaging session window 300 also includes a window menu 350 providing a set of client application controls that can be accessed by the first user, and a set of contact or "buddy" controls 360 that can be accessed by the user to maintain a list of messaging contacts, view which messaging contacts are available to communicate with using the messaging system, and switch from the current messaging session to another messaging session with another user in the first user's contact list.

In accordance with an exemplary embodiment of the present invention, messaging session window 300 also includes a current contact area 370 that displays a representation of the second user with whom the first user is currently engaged in a messaging session. As illustrated, the representation includes a username 375 specified by the second user and a graphical image of a gender-based avatar 380 assigned by the messaging system to represent the second user in messaging communications. In sample messaging session window 300, the username of the second user is "Amodini Visweswaran", and the gender-based avatar assigned to the second user is an image of a female character. Gender-based avatar 380 is female in the current example because "Amondini" has been determined as having a probable gender of female by, for example, an anthroponomastic analysis component (such as username analysis controller 250 of the exemplary embodiment described with reference to FIG. 2) implemented within the messaging system server. The display of gender-based avatar 380 in current contact area 370 enables the first user to determine the gender of the second user with whom the first user is communicating by perceiving the gender-based avatar being projected, rather than by assessing the username of the second user. Here, the gender-based avatar displayed is an avatar that only includes a graphical image of a face in a small square shaped area, which may be referred to as a facial avatar or a head avatar. Of course, in other exemplary embodiments, any other suitable type of avatar sufficient to convey gender may be displayed in an area of any suitable shape and size. For example, the gender-based avatar may include additional body parts.

As described herein, exemplary embodiments of the present invention can be utilized to aid electronic messaging application users in identifying the gender of other users with which they are communicating. Exemplary embodiments can thus enable electronic messaging application users to have a greater social presence in messaging communications and to communicate across different cultures more easily without offending other users. Exemplary embodiments can be particularly suitable, for example, for implementation within instant messaging applications being used by users as a business communications medium. By utilizing instant messaging, business users can view each other's availability and initiate a text conversation with colleagues or customers without the restrictions of time and space. Generally, when a user logs into an instant messaging application for the purpose of business communications, the username or screen name that identifies the account for the user to the user's contacts is that user's personal name (that is, the true proper name given to that individual at birth or otherwise legally identifying that individual). Thus, where two business contacts who have never met in person are engaged in an instant messaging session, each contact will be provided with an indication to the other contact's gender during the messaging session.

Exemplary embodiments of the present invention can be realized in hardware, software, or a combination of hardware and software. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system in which exemplary embodiments can be implemented may include, inter alia, one or more computers and at least a computer program product on a computer readable medium, allowing a computer system to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allows a computer system to read such computer readable information.

Figure 4:
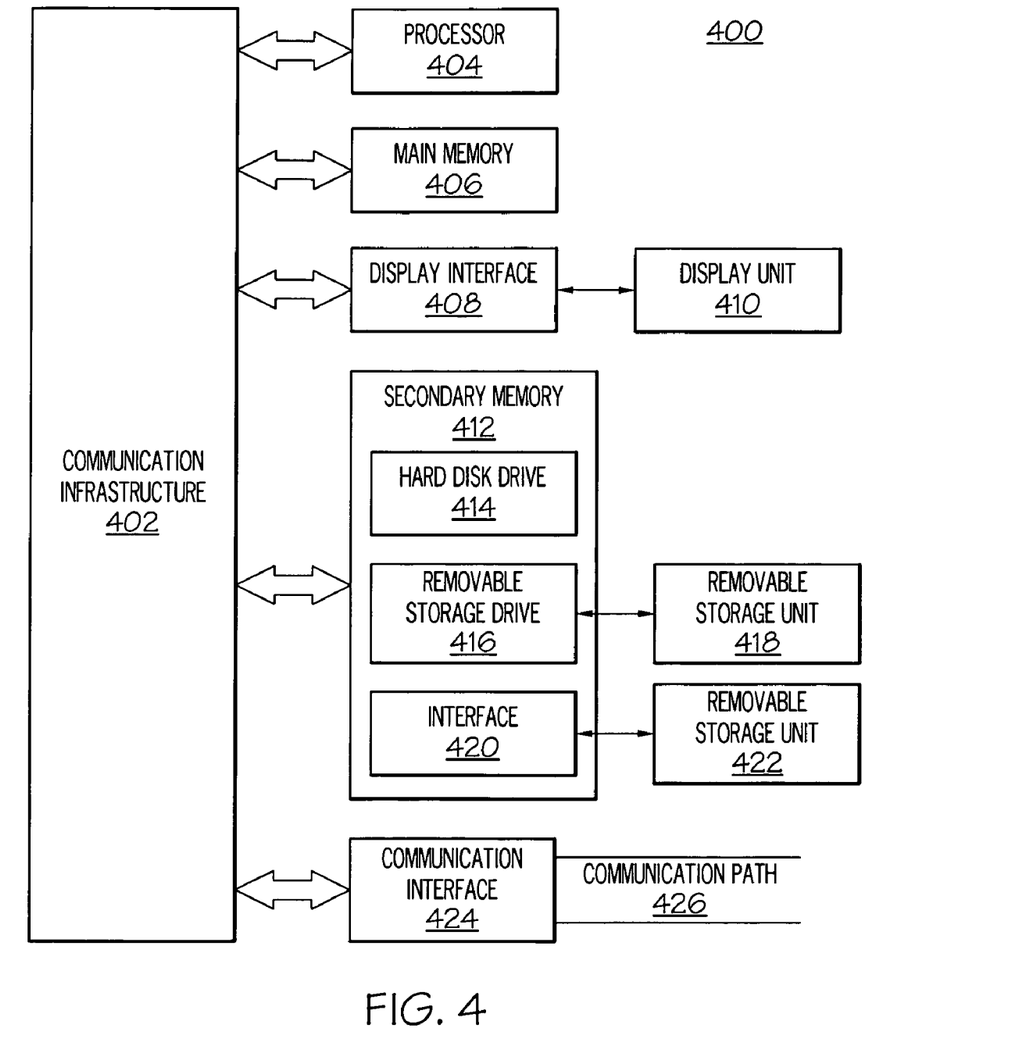
FIG. 4 is a block diagram illustrating a representation of a computer system within which an exemplary embodiment of the present invention can be implemented.

FIG. 4 is a block diagram of an exemplary computer system 400 that can be used for implementing exemplary embodiments of the present invention. Computer system 400 includes one or more processors, such as processor 404. Processor 404 is connected to a communication infrastructure 402 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 400 can include a display interface 408 that forwards graphics, text, and other data from the communication infrastructure 402 (or from a frame buffer not shown) for display on a display unit 410. Computer system 400 also includes a main memory 406, which can be random access memory (RAM), and may also include a secondary memory 412. Secondary memory 412 may include, for example, a hard disk drive 414 and/or a removable storage drive 416, representing a floppy disk drive, a magnetic tape drive, an optical disk drive, etc. Removable storage drive 416 reads from and/or writes to a removable storage unit 418 in a manner well known to those having ordinary skill in the art. Removable storage unit 418, represents, for example, a floppy disk, magnetic tape, optical disk, etc. which is read by and written to by removable storage drive 416. As will be appreciated, removable storage unit 418 includes a computer usable storage medium having stored therein computer software and/or data.

In exemplary embodiments, secondary memory 412 may include other similar means for allowing computer programs or other instructions to be loaded into the computer system. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between the computer system and external devices. Examples of communications interface 424 may include a modem, a network interface (such as an Ethernet card), a communications port, a PCMCIA slot and card, etc. Software and data transferred via communications interface 424 are in the form of signals which may be, for example, electronic, electromagnetic, optical, or other signals capable of being received by communications interface 424. These signals are provided to communications interface 424 via a communications path (that is, channel) 426. Channel 426 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 406 and secondary memory 412, removable storage drive 416, a hard disk installed in hard disk drive 414, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network that allows a computer system to read such computer readable information.

Computer programs (also called computer control logic) are stored in main memory 406 and/or secondary memory 412. Computer programs may also be received via communications interface 424. Such computer programs, when executed, can enable the computer system to perform the features of exemplary embodiments of the present invention as discussed herein. In particular, the computer programs, when executed, enable processor 404 to perform the features of computer system 400. Accordingly, such computer programs represent controllers of the computer system.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A computer apparatus, the computer apparatus comprising:
    a computer-usable medium having computer-readable instructions stored thereon for execution by a processor to implement a device for displaying gender-based avatar representations of users in instant messaging communications, the device comprising:
        a username analysis component implemented within an instant messaging system providing for communication between a first user and a second user each having a user account registered with the instant messaging system, the username analysis component performing an anthroponomastic analysis of a username for the first user to assign a probable gender for the first user, the probable gender being selected from male, female, and neutral; and
        an interface component implemented within a user interface provided by an instant messaging client application to the first user on a first client system and the second user on a second client system when the first user and the second user are participating in a communication session with one another via the instant messaging system, the interface component displaying the username for the first user and a gender-based avatar representation indicative of the probable gender for the first user to the second user in a current contact area of a communication session window provided by the user interface.

2. The computer apparatus of claim 1, wherein the user interface permits the first and second users to send and receive instant messages using the communication session window provided by the user interface via a network.

3. The computer apparatus of claim 2, wherein the username analysis component is implemented within an instant messaging server, wherein the instant messaging server is operatively coupled to the network and manages the communication session between the first and second users, and wherein the instant messaging client application establishes a connection with the instant messaging server via the network.

4. The computer apparatus of claim 3, wherein the username analysis component accesses a first database storing anthroponomastic information to perform the anthroponomastic analysis of the username of the first user to determine the probable gender for the first user, wherein the instant messaging server stores the gender-based avatar representation of the first user in a second database storing user account information, wherein the instant messaging server maintains the first and second databases, and wherein the instant messaging server communicates the gender-based avatar representation of the first user to second client system via the network when the communication session between the first and second users is established.

5. The computer apparatus of claim 4, wherein the username analysis component assigns the probable gender for the first user as neutral if the anthroponomastic analysis of the username is not able to assign the probable gender as either male or female, wherein the interface component displays the gender-based avatar representation of the first user and provides the first user with an option to select a different gender-based avatar representation, and wherein the username analysis component replaces the gender-based avatar representation of the first user with the different gender-based avatar representation in the second database if selected by the user.

* * * * *